United States Patent [19]
Nagatomo

[11] 4,009,769
[45] * Mar. 1, 1977

[54] AUTOMATICALLY ADJUSTING BRAKING DEVICE

[75] Inventor: Masatugu Nagatomo, Hirakata, Japan

[73] Assignee: Kabushiki Kaisha Komatsu Seisakusho, Tokyo, Japan

[ * ] Notice: The portion of the term of this patent subsequent to Nov. 11, 1992, has been disclaimed.

[22] Filed: Sept. 23, 1975

[21] Appl. No.: 615,927

Related U.S. Application Data

[63] Continuation-in-part of Ser. No. 485,201, July 2, 1974, Pat. No. 3,918,556.

[52] U.S. Cl. .................. 188/77 R; 188/196 BA
[51] Int. Cl.² ..................................... F16D 49/20
[58] Field of Search .... 188/77 R, 79.5 K, 79.5 GC, 188/196 BA

[56] References Cited

UNITED STATES PATENTS

| | | | |
|---|---|---|---|
| 3,103,991 | 9/1963 | Flinn | 188/77 R |
| 3,184,006 | 5/1965 | Fox | 188/77 R |
| 3,473,632 | 10/1969 | Kimura et al. | 188/77 R |
| 3,820,636 | 6/1974 | Kass | 188/77 R |
| 3,913,556 | 11/1975 | Nagamoto | 188/77 R |

*Primary Examiner*—Duane A. Reger
*Attorney, Agent, or Firm*—Armstrong, Nikaido & Wegner

[57] ABSTRACT

An automatically adjusting braking device in a band brake of a vehicle for automatically adjusting the gap between the brake drum and lining, and which has an adjusting component connected to the brake band and a feed mechanism for driving the adjusting component. The feed mechanism is connected between the adjusting component and a piston rod of a hydraulic cylinder piston assembly. Thus, a reduction in the braking force due to wearing of the brake lining is prevented.

7 Claims, 4 Drawing Figures

AUTOMATICALLY ADJUSTING BRAKING DEVICE

CROSS REFERENCE TO RELATED APPLICATION

This application is a Continuation-In-Part application of our prior U.S. Pat. Application Ser. No. 485,201 filed July 2, 1974 entitled AUTOMATICALLY ADJUSTING BRAKING DEVICE now U.S. Pat. No. 3,918,556.

BACKGROUND OF THE INVENTION

This invention relates to a hydraulic braking device of the band type used mainly in construction machinery vehicles, and more particularly to an automatically adjusting braking device for automatically adjusting the gap between a brake drum and a brake lining when the brake lining is worn.

SUMMARY OF THE INVENTION

It is an object of the present invention to provide an automatically adjusting brake device in a band brake of a vehicle for automatically adjusting the gap between a brake drum and a brake lining which may prevent the braking force from being reduced due to wearing of the brake lining.

It is another object of the present invention to provide an automatically adjusting braking device in a band brake of a vehicle for automatically adjusting the gap between a brake drum and a brake lining which may prevent the stroke of the brake pedal from being increased.

According to an aspect of the present invention, there is provided an automatically adjusting braking device for a band brake, which comprises a brake drum secured to a vehicle body with a brake band in engaging contact therearound with one end secured to an anchor means and the other end secured to an adjusting component wherein the anchor means is connected between a piston rod projecting from a hydraulic cylinder-piston assembly and said adjusting component through a feed mechanism for driving the adjusting component and wherein a return spring is connected between said anchor means and the vehicle body.

In the device as set forth in the foregoing aspect, the adjusting component is composed of an adjusting bolt, one end thereof being connected to the feed mechanism and the other end coming into contact with with the anchor means through a pin shaft; and an adjusting member, one end thereof being threadingly engaged with the adjusting bolt and the other end being secured to one end of the brake band.

Further, in the device, the feed mechanism comprises an one-way clutch engaged with the adjusting bolt and having two levers at each side thereof, one of which a roller is provided at the distal end thereof and the other of which a suspending means is provided so as to prevent the one-way clutch from being moved due to vibration of the vehicle body; a connecting member connected between the piston rod of the cylinder-piston assembly and the anchor means; a plate member fixedly securd to one sideend portion of the connecting member; a leaf spring of a substantially U-shaped and provided at the inside of the plate member so that one engaging portion of the leaf spring comes into contact with the roller and the other engaging portion thereof is so provided as to space apart from the roller at such a distance as adding a slight addition to a stroke of the piston rod corresponding to the gap between the brake drum and a brake lining.

BRIEF DESCRIPTION OF THE DRAWINGS

The above and other objects, features and advantages of the present invention will become more fully apparent from the following description taken in conjunction with the accompanying drawings in which.

DETAILED DESCRIPTION OF THE PREFERRED EMBODIMENTS

Figure 1:
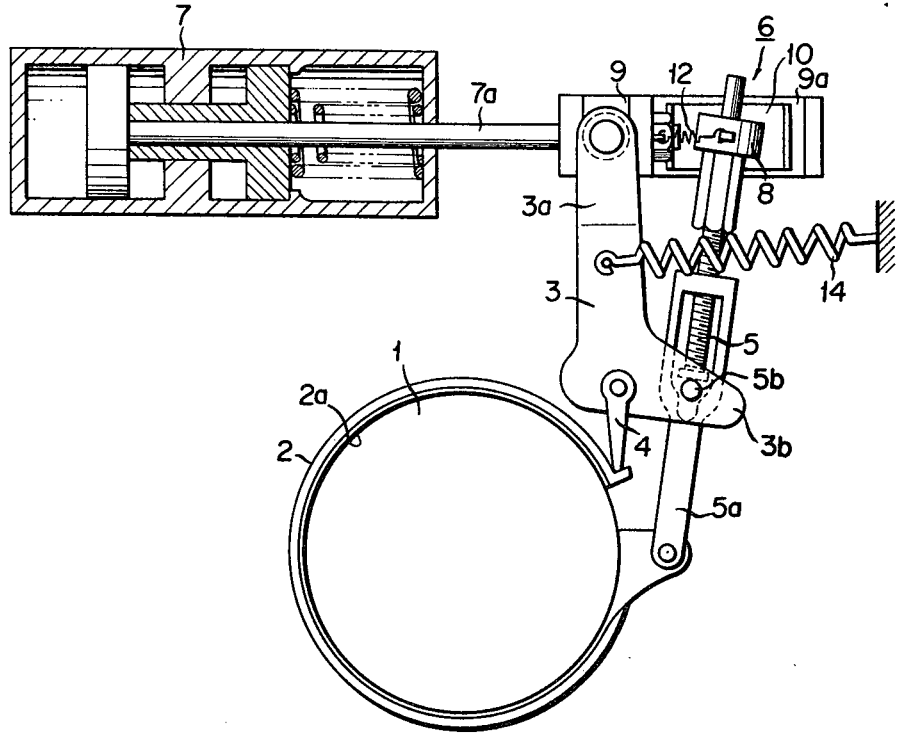
FIG. 1 is a schematic view of the entire braking device of one embodiment of the present invention.
Figure 2:
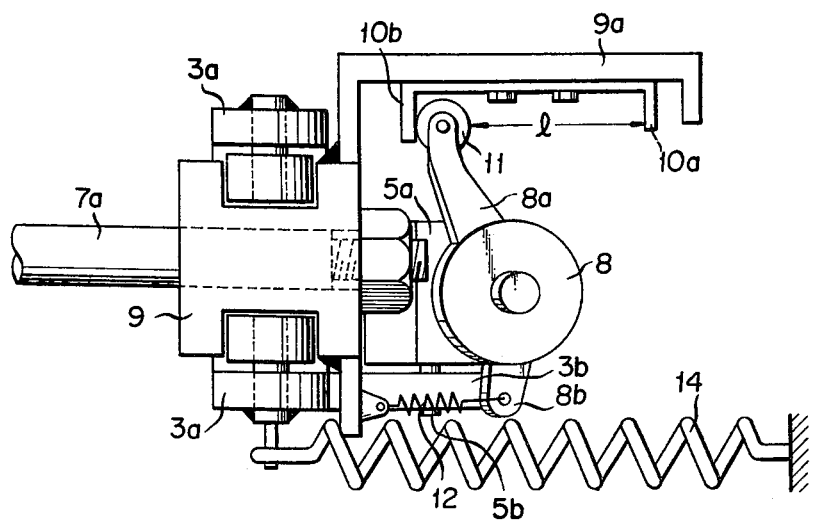
FIG. 2 is an enlarged view of the essential part of the braking device of the present invention.
Figure 3:
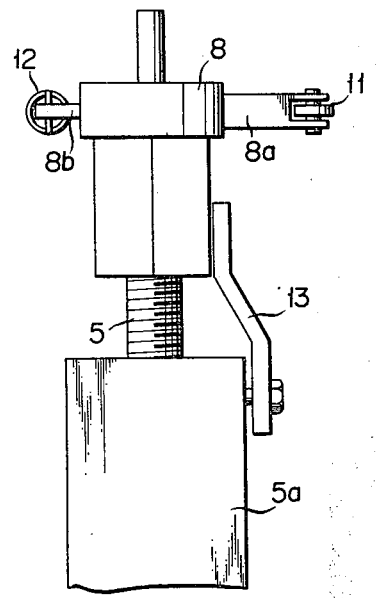
FIG. 3 is a side view of the braking device.

Reference is now made to FIGS. 1 to 3, which show one embodiment of the braking device of the present invention, numeral 1 indicates a brake drum secured to a construction vehicle (not shown), 2 represents a brake band in which a brake lining 2a is provided on the inner peripheral surface thereof. The brake band 2 is provided around the outer periphery of the brake drum 1. One end of the brake band 2 is engaged with a claw 4 projected from a foot of an anchor 3 and the other end thereof is journalled with the lower end of an adjusting component composed of an adjusting bolt 5 and an adjusting member 5a threadingly engaged with the bolt 5. The adjusting component is provided in close proximity of the anchor 3. The adjusting bolt 5 always comes into contact with the anchor 3 through a pin shaft 5b provided at the foot portion 3b of the anchor 3. The anchor 3 is connected through U-shaped upper branch ends 3a, 3a thereof to a connecting member 9 provided at the end of an actuating means such as, for example, a piston rod 7a of a hydraulic cylinder-piston assembly as illustrated in FIG. 1. The adjusting component is so provided as to freely adjust the gap provided between the outer peripheral surface of the brake drum 1 and the inner peripheral surface of the brake lining 2a when the adjusting bolt 5 is rotated by a feed mechanism 6 provided in the proximity of the upper portion of the adjusting component. The feed mechanism 6 is composed of an one way clutch 8 provided at the upper end of the adjusting bolt 5 and the connecting member 9 for driving the clutch 8. A lever 8a of the one-way clutch 8 which has a roller 11 at the distal end thereof is projected toward a plate member 9a fixedly secured to one sideend portion of the connecting member 9. The lever 8a is engaged through the roller 11 with a leaf spring 10 of substantially U-shaped and provided at the inside of the plate member 9a. The leaf spring 10 is so provided as to add a slight addition to the gap provided between the brake drum 1 and the brake lining 2a at a distance $l$ provided between an engaging portion 10a formed at one end of the leaf spring 10 and the roller 11. At the opposite side of the lever 8a, the one-way clutch is suspended by a spring 12 connected between the other lever 8b of the clutch 8 and the connecting member 9 so as to prevent the one-way clutch 8 from being rotated due to the vibration of the vehicle body. Reference numeral 13 denotes another leaf spring for preventing the adjusting bolt from being rotated due to the vibration of the vehicle body, numeral 14 is a return spring for the anchor 3.

In operation of the thus constructed braking device of the present invention, when the brake lining 2a is worn from a long time of use, the gap provided between the brake drum 1 and the brake lining 2a is excessively enlarged. As a result, the stroke of the piston rod 7a of the hydraulic cylinder-piston assembly is increased so that the stroke of the piston rod 7a exceeds the distance l measured between the engaging portion 10a of the leaf spring 10 and the roller 11. Therefore, when the piston rod 7a is forwarded to the increased stroke end thereof for the purpose of applying the brake to the vehicle, the roller 11 comes into contact with the engaging portion 10a of the leaf spring 10 and is urged by the engaging portion 10a so that the one-way clutch 8 is rotated. At that time, the adjusting bolt 5 is not rotated together with the one-way clutch 8, that is, the one-way clutch is rotated without receiving any restriction. Then, when the braking operation ceases, the piston rod 7a is returned to the initial position together with the anchor 3 because the anchor is drawn by the return spring 14. By this returning action of the piston rod 7a and anchor 8, the roller 11 is returned also through the opposite engaging portion 10b of the leaf spring 10 to the initial position so that the one-way clutch 8 is rotated reversely. In case of this reverse rotation of the one-way clutch 8, the adjusting bolt 5 is rotated together with the one-way clutch 8 because at that time the adjusting bolt 5 is engaged with the one-way clutch 8. When the bolt 5 is rotated by the one-way clutch 8, the adjusting member 5b is moved upward along the longitudinal direction thereof since the adjusting member 5b is threadingly engaged with the adjusting bolt 5. Thus, the excess of gap generated between the brake lining 2a and the brake drum 1 due to wearing of the brake lining 2a is automatically adjusted.

As to the prevention of excessive adjusting, it is not necessary to particularly provide a device for preventing the excessive adjusting which maintains simplicity of construction, because the distance l measured between the roller 11 and the engaging portion 10a of the leaf spring 10 is determined in consideration of the amount of slack of the brake band 2 at a time when emergency braking occurs (this is the cause of the excessive adjusting).

Figure 4:
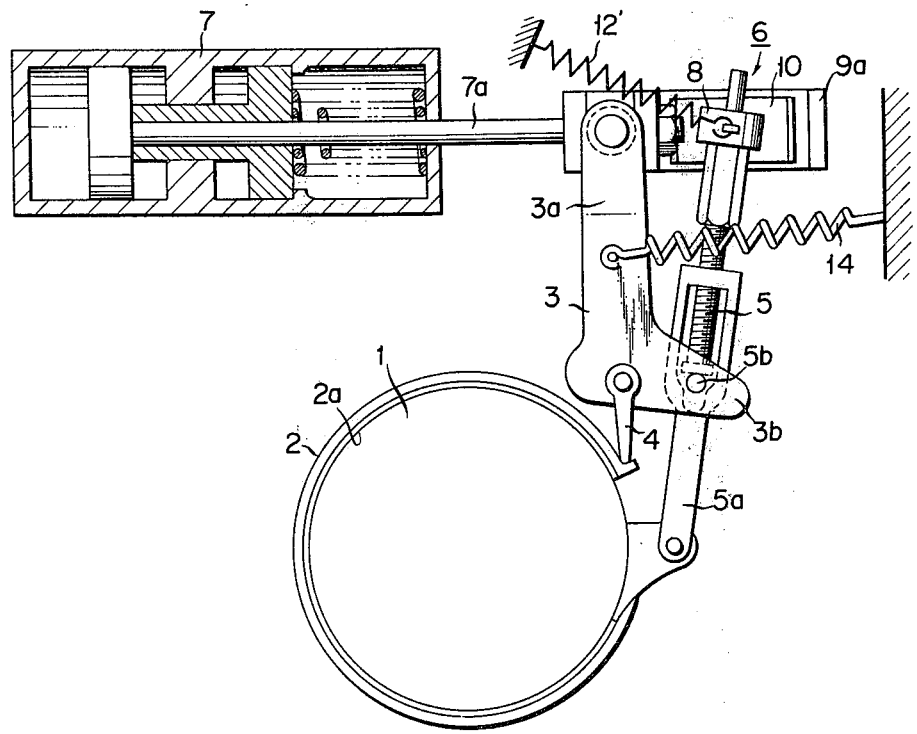
FIG. 4 is a schematic view of the entire braking device of another embodiment of the present invention.

Referring to FIG. 4, which shows another embodiment of the braking device of the invention, like reference numerals and characters designate corresponding parts to the first embodiment shown in FIG. 1. The embodiment shown in FIG. 4 is very similar to the embodiment shown in FIG. 1 with respect to not only the structure but also the operation. There is, however, a structural difference between the respective embodiments shown in FIGS. 1 and 4. Namely, in the embodiment shown in FIG. 4, the one-way clutch 8 is suspended by a spring 12' provided between the lever 8b of the one-way clutch 8 and the vehicle body.

It should be understood from the foregoing description that since the one-way clutch of the feed mechanism provided between the piston rod of the hydraulic cylinder-piston assembly and the adjusting component composed of the adjusting bolt and member is rotated freely upon applying the braking operation when there is an excess of gap between the brake lining and the brake drum, and since, when the braking operation ceases, the adjusting bolt is rotated by the reverse rotation of the one-way clutch which is caused by the action of the return spring so as to adjust the excess of gap, it is not anticipated to the automatically adjusting braking device of the present invention that the braking force will be reduced by the wear of the brake lining such that the braking operation becomes impossible, thus the safety of the vehicle is remarkably improved. In addition, it should also be understood that, since the rotating timing of the one-way clutch is provided in consideration of the amount of slack of the brake band at a time when emergency braking occurs, no possibility of excessive adjusting is caused so that any device for preventing the excessive adjusting is not necessary in the automatically adjusting braking device of the present invention, thus permitting the braking device to be easily produced at less expense.

What is claimed is:

1. An automatically adjusting braking device for a band brake, which comprises a brake drum secured to a vehicle body with a brake band in engaging contact therearound with one end secured to an anchor means and the other end secured to an adjusting component wherein the anchor means is connected between the end of an actuating means and said adjusting component through a feed mechanism for driving said adjusting component and wherein a return spring is connected between said anchor means and the vehicle body.

2. An automatically adjusting braking device as set forth in claim 1, wherein said actuating means is a piston rod projecting from and associated with a hydraulic cylinder-piston assembly.

3. An automatically adjusting braking device as set forth in claim 1, wherein said adjusting component comprises an adjusting bolt, one end thereof being connected to the feed mechanism and the other end coming into contact with the anchor means through a pin shaft provided at a foot portion of the anchor means, and an adjusting member, one end thereof being threadingly engaged with the adjusting bolt so that said adjusting member is moved along the longitudinal direction thereof when the adjusting bolt is rotated by the action of the feed mechanism driven by the operation of the return spring and the other end being secured to one end of the brake band.

4. An automatically adjusting braking device as set forth in claim 3, said feed mechanism comprises an one-way clutch engaged with the adjusting bolt and having two levers at each side thereof, one of which a roller is provided at the distal end thereof and the other of which a suspending means is provided so as to prevent the one-way clutch from being moved due to vibration of the vehicle body; a connecting member connected between the end of an actuating means and the anchor means; a plate member fixedly secured to one side-end portion of the connecting member; a leaf spring of a substantially U-shaped form provided at the inside of said plate member so that one engaging portion of the leaf spring comes into contact with the roller and the other engaging portion thereof is so provided as to space apart from the roller at such a distance as adding a slight addition to a stroke of the end of the actuating means corresponding to the gap provided between the outer peripheral surface of the brake drum and the inner peripheral surface of a lining of the brake band.

5. An automatically adjusting braking device as set forth in claim 4, wherein said suspending means is composed of a spring connected between said connecting member and said the other lever of the one-way clutch.

6. An automatically adjusting braking device as set forth in claim 4, wherein said suspending means is composed of a spring connected between the vehicle body and said the other lever of the one-way clutch.

7. An automatically adjusting braking device as set forth in claim 4, wherein said actuating means is a piston rod projecting from and associated with a hydraulic cylinder-piston assembly.

* * * * *